(12) United States Patent
Ifuku

(10) Patent No.: US 10,863,067 B2
(45) Date of Patent: Dec. 8, 2020

(54) IMAGE PICKUP UNIT THAT ALLOWS OPTICAL ADJUSTMENT

(71) Applicant: CANON KABUSHIKI KAISHA, Tokyo (JP)

(72) Inventor: Hirotaka Ifuku, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/585,090

(22) Filed: Sep. 27, 2019

(65) Prior Publication Data
US 2020/0120241 A1 Apr. 16, 2020

(30) Foreign Application Priority Data
Oct. 16, 2018 (JP) .................................. 2018-195148

(51) Int. Cl.
H04N 5/225 (2006.01)
G02B 7/02 (2006.01)

(52) U.S. Cl.
CPC ........... H04N 5/2253 (2013.01); G02B 7/023 (2013.01); H04N 5/2254 (2013.01)

(58) Field of Classification Search
CPC ..... H04N 5/2253; H04N 5/2254; G02B 7/023
See application file for complete search history.

(56) References Cited

U.S. PATENT DOCUMENTS

| | | | |
|---|---|---|---|
| 5,684,640 A * | 11/1997 | Tanaka ................. | G02B 27/646 250/201.2 |
| 7,457,056 B2 | 11/2008 | Kobayashi | |
| 7,973,854 B2 * | 7/2011 | Kobayashi ........... | H04N 5/2253 348/373 |
| 8,441,572 B2 * | 5/2013 | Konishi ................ | H04N 5/2253 348/374 |
| 2004/0212720 A1 * | 10/2004 | Kobayashi ........... | H04N 5/2254 348/340 |
| 2010/0245662 A1 * | 9/2010 | Ishikawa ............... | H04N 5/2253 348/374 |
| 2011/0150461 A1 * | 6/2011 | Hase ..................... | H04N 5/2171 396/535 |
| 2011/0228164 A1 * | 9/2011 | Kinoshita ............. | H04N 5/2253 348/374 |

(Continued)

FOREIGN PATENT DOCUMENTS

JP 2004325555 A 11/2004

*Primary Examiner* — Shahbaz Nazrul
(74) *Attorney, Agent, or Firm* — Rossi, Kimms & McDowell LLP

(57) ABSTRACT

An image pickup unit that is capable of simplifying an optical adjustment work for an image pickup surface. A holding plate holds an image sensor. A lens barrel includes an optical system that forms an object image on the image sensor. A removable shim plate is inserted between the lens barrel and the holding plate and has a shape to avoid the image sensor. An energizing mechanism is inserted between the shim plate and the lens barrel to energizes the shim plate and the holding plate in a direction away from the lens barrel. Three adjusting screws fix the holding plate and shim plate to the lens barrel. Each of the adjusting screws displaces corresponding portions of the shim plate and holding plate toward the lens barrel when being fastened and displaces the corresponding portions away from the lens barrel in cooperation with the energizing mechanism when being loosened.

9 Claims, 13 Drawing Sheets

(56) References Cited

U.S. PATENT DOCUMENTS

| | | | |
|---|---|---|---|
| 2015/0153584 A1* | 6/2015 | Yasuda | G02B 27/646 359/557 |
| 2018/0088449 A1* | 3/2018 | Hatano | G02B 7/023 |
| 2019/0394369 A1* | 12/2019 | Huo | H04N 5/2257 |
| 2020/0201139 A1* | 6/2020 | Naito | H04N 5/23258 |

* cited by examiner

IMAGE PICKUP UNIT THAT ALLOWS OPTICAL ADJUSTMENT

BACKGROUND OF THE INVENTION

Field of the Invention

The present invention relates to an image pickup unit that allows optical adjustment of an image pickup surface of an image sensor.

Description of the Related Art

Generally, an image pickup unit provided in a video camera etc. converts an optical image of an object formed by an optical system included in a lens barrel etc. into an electrical signal using an image sensor like a CMOS sensor. The converted electrical signal is converted into image data by an image processing IC, and is recorded on a memory etc.

Since an optical system provided in a lens barrel may have a tilt or displacement of a lens or a lens holding member due to a manufacture error, an image plane of an optical system may tilt with respect to a plane that intersects perpendicularly with a design optical axis. Moreover, an image pickup surface of an image sensor like a CMOS sensor may tilt with respect to a plane that intersects perpendicularly with a design optical axis due to a manufacture error. If there is tilt deviation between an image plane of an optical system and an image pickup surface of an image sensor due to the tilts of the image plane and the image pickup surface, image quality of the image data obtained will deteriorate. Specifically, "partial defocus" that means defocus in a periphery of an image occurs when focusing on a center of an image.

An optical adjustment method called "tilt adjustment" that matches the tilt of the image plane with the tilt of the image pickup surface has been proposed. Japanese Laid-Open Patent Publication (Kokai) No. 2004-325555 (JP 2004-325555A) discloses an image pickup apparatus that is provided with a lens barrel, an image sensor, and a holding plate to which the image sensor is attached. This image pickup apparatus is configured so that the holding plate will be fixed to the lens barrel by fastening adjusting screws at a plurality of positions while sandwiching an elastic member between the lens barrel and holding plate. A tilt of this image sensor can be adjusted by changing the fastening amounts of the screws.

Incidentally, in the apparatus of the above-mentioned publication, receiving surfaces of the lens barrel and holding plate are designed so that a center of an image pickup surface will be coincident with a design image forming position in an optical axis direction in a state where the adjusting screws are loosened by a predetermined amount. This is for securing an adjustment margin so as to enable the tilt adjustment that tilts the holding plate toward the lens barrel by fastening the adjusting screw. Accordingly, a work to loosen the adjustment screws, which have been fully fastened, by a predetermined amount is needed before the tilt adjustment of the image pickup surface. As a result of this work to loosen the adjusting screws, the center position of the image pickup surface may deviate from the design image forming position in the optical axis direction and the image pickup surface may tilt with respect to a plane that intersects perpendicularly with a design optical axis because of variation of the loosening amount in each work. Accordingly, the work to loosen the adjusting screws is always required, even when a manufacture error is small. Furthermore, the tilt adjustment is required after the work to loosen the adjusting screws in many cases. Accordingly, there is a problem that the optical adjustment work of an image pickup surface is not easy.

If the optical system is designed so that the center of the image pickup surface will be coincident with the design image forming position in the optical axis direction in a state where the adjusting screws are fully fastened, the work to loosen the adjustment screws to move the image pickup surface to the image forming position is almost unnecessary. However, since this design eliminates the adjustment margin for the tilt adjustment that tilts the holding plate toward the lens barrel, the adjustable range of the tilt adjustment becomes narrow.

SUMMARY OF THE INVENTION

The present invention provides an image pickup unit that is capable of simplifying an optical adjustment work for an image pickup surface.

Accordingly, a first aspect of the present invention provides an image pickup unit including a holding plate that holds an image sensor board on which an image sensor is implemented, a lens barrel that includes an optical system that forms an object image on the image sensor, a shim plate that is inserted between the lens barrel and the holding plate in an optical axis direction of the optical system and that has a shape to avoid the image sensor at least, an energizing mechanism that is inserted between the shim plate and the lens barrel in the optical axis direction and that energizes the shim plate and the holding plate in a direction away from the lens barrel, and at least three adjusting screws that are screwed to the lens barrel. Each of the adjusting screws displaces corresponding portions of the shim plate and the holding plate in a direction close to the lens barrel when being fastened and displaces the corresponding portions in a direction away from the lens barrel in cooperation with the energizing mechanism when being loosened. The shim plate is constituted so that tilt of an image pickup surface of the image sensor to an image plane of the optical system will become approximately zero and so that a position of the image pickup surface will approximately coincide with a position of the image plane in the optical axis direction in design, in the state where all the adjusting screws are fastened.

According to the present invention, the optical adjustment work for the image pickup surface is simplified.

Further features of the present invention will become apparent from the following description of exemplary embodiments with reference to the attached drawings.

DESCRIPTION OF THE EMBODIMENTS

Figure 1:
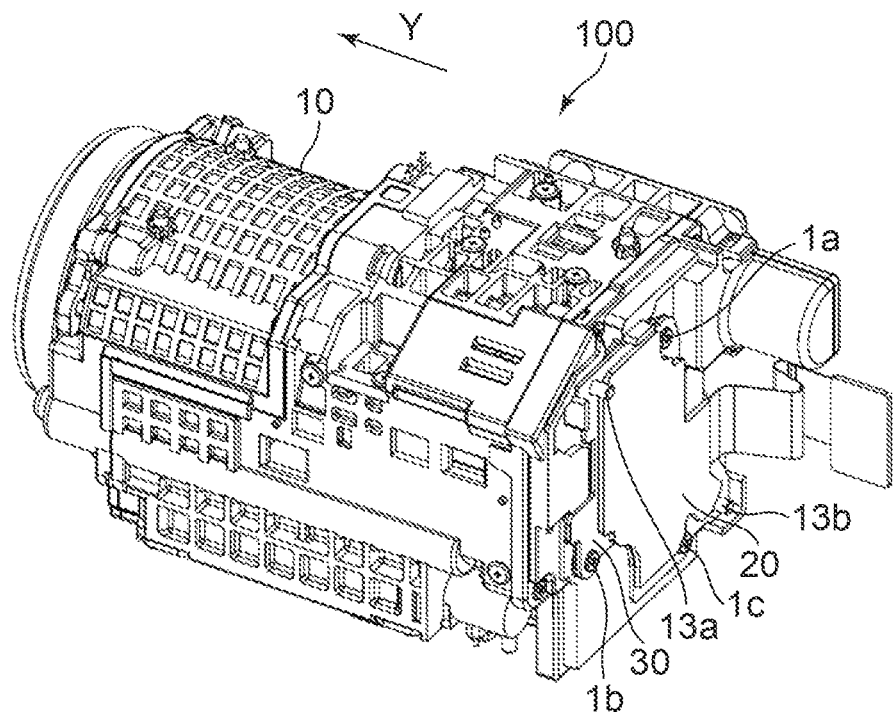
FIG. 1 is a perspective view showing an image pickup unit according to a first embodiment of the present invention.

Hereafter, embodiments according to the present invention will be described in detail by referring to the drawings.

Figure 2:
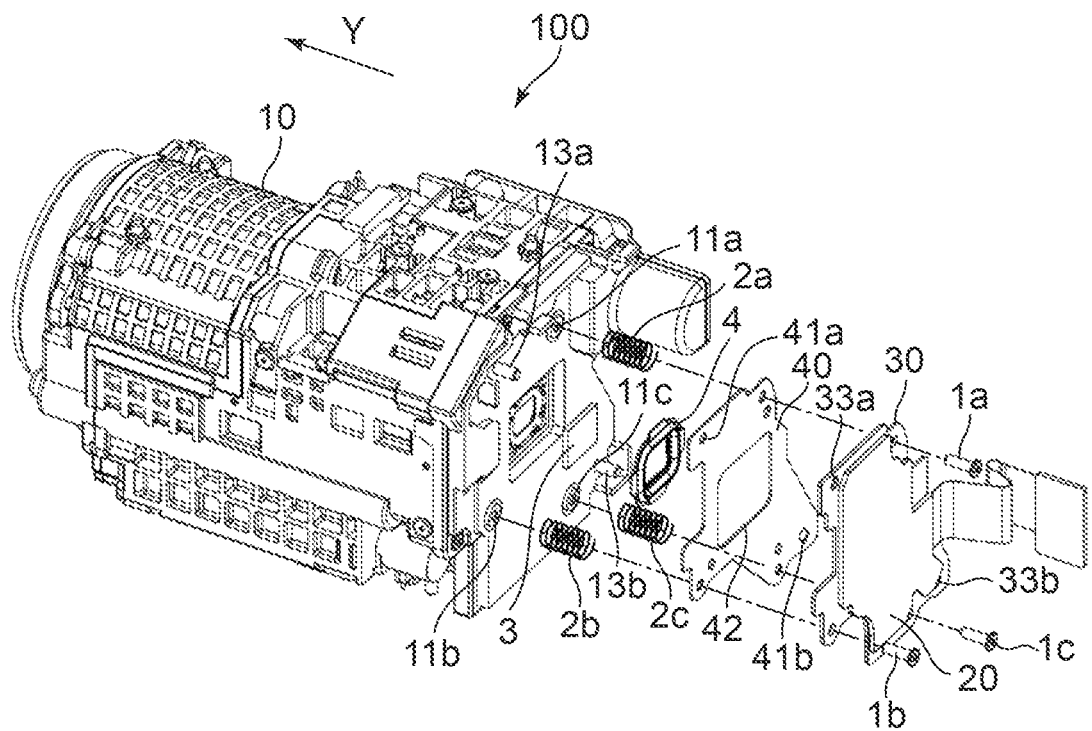
FIG. 2 is an exploded perspective view showing the image pickup unit in FIG. 1.

FIG. 1 and FIG. 2 are respectively a perspective view and an exploded perspective view showing an image pickup unit according to a first embodiment of the present invention. This image pickup unit 100 is applied to a video camera, for example. Hereinafter, an object side shall be a front side (+Y side in the drawings) and the opposite side (−Y side) shall be a back side.

The image pickup unit 100 has a lens barrel 10, a sensor substrate 20, a holding plate 30, a shim plate 40, a first adjusting screw 1a, a second adjusting screw 1b, a third adjusting screw 1c, a first spring 2a, a second spring 2b, a third spring 2c, a glass 3, and an elastic member 4. An optical axis X (FIGS. 6B, 7A, and 7B) of an optical system built in the lens barrel 10 is parallel to a Y-direction in design. The optical axis X is an ideal design optical axis. A CMOS sensor 21 (FIG. 3B) as an image sensor is implemented on the sensor substrate (image sensor board) 20. In the image pickup unit 100, an object image is formed on an image pickup surface of the CMOS sensor 21 with the optical system. The lens barrel 10 has a first screw boss 11a, second screw boss 11b, and third screw boss 11c for attaching the holding plate 30. The lens barrel 10 has a first guide pin 13a and second guide pin 13b for regulating movements and positions of the holding plate 30 and shim plate 40 in a direction within a plane that intersects perpendicularly with the optical axis X. The guide pins 13a and 13b are protruded toward the back side.

Figure 3A:
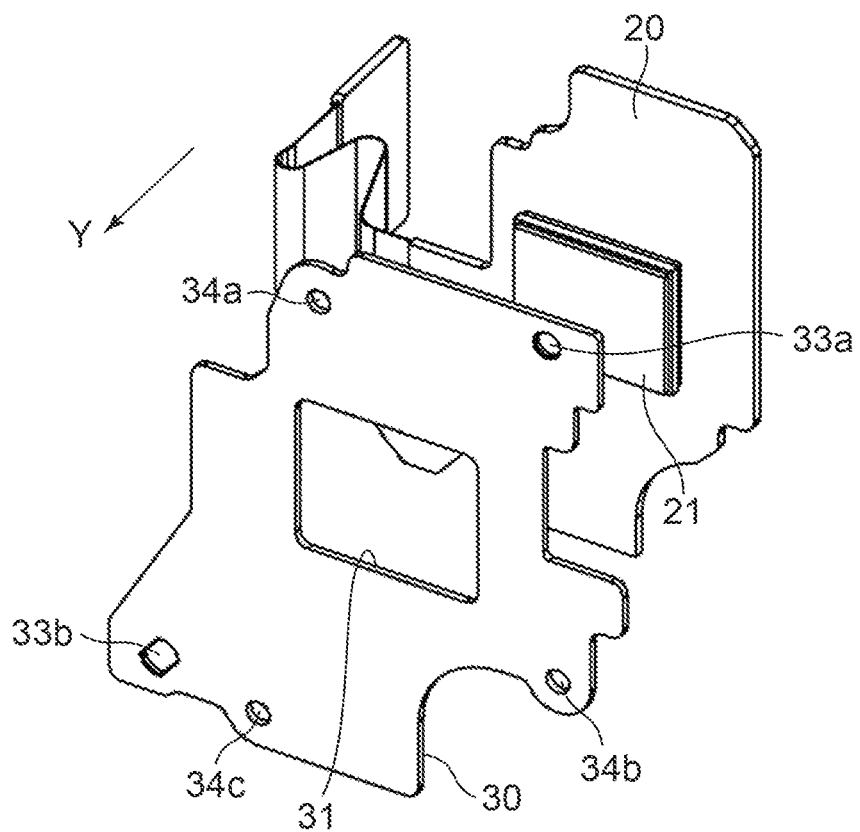
FIG. 3A is a front-side exploded perspective view showing a sensor substrate and a holding plate of the image pickup unit in FIG. 1.
Figure 3B:
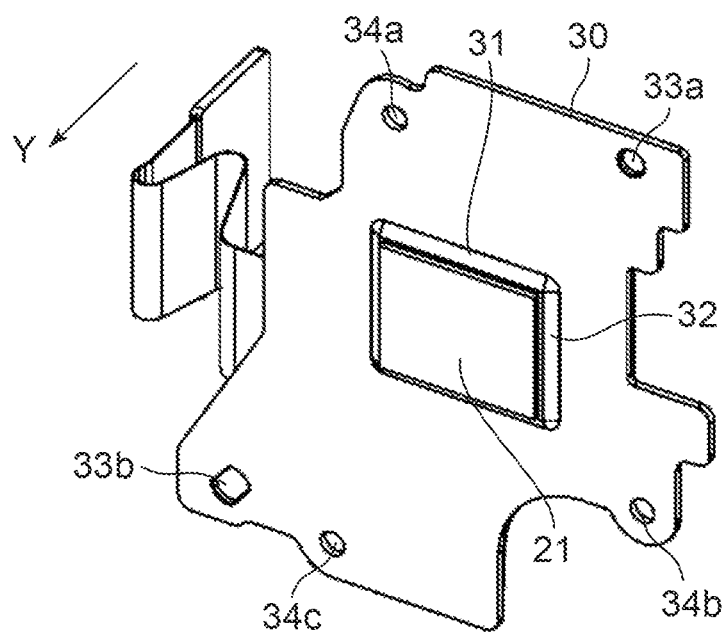
FIG. 3B is a front-side perspective view showing an adhesion state of the sensor substrate and the holding plate.
Figure 4:
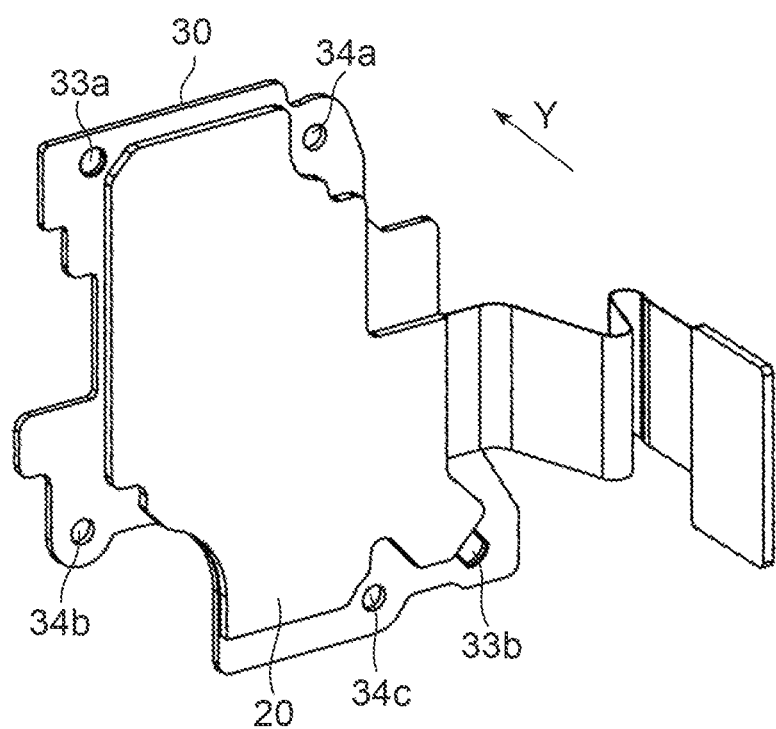
FIG. 4 is a back-side perspective view showing the adhesion state of the sensor substrate and the holding plate.

FIG. 3A is a front-side exploded perspective view showing the sensor substrate 20 and the holding plate 30. FIG. 3B and FIG. 4 are perspective views showing an adhesion state of the sensor substrate 20 and the holding plate 30. FIG. 3B and FIG. 4 show the sensor substrate 20 and holding plate 30 viewed from the front side and the back side, respectively.

As shown in FIG. 3A, the CMOS sensor 21 is implemented on the front surface of the sensor substrate 20. The holding plate 30 is provided with an opening 31 for adhesion. The sensor substrate 20 is attached to the holding plate 30 from the back side (FIG. 4). The CMOS sensor 21 protrudes from the opening 31 to the front side of the holding plate 30 (FIG. 3B). Adhesive material 32 fills up the opening 31 so as to surround the CMOS sensor 21. The adhesive material 32 adheres the CMOS sensor 21 to the opening 31, and the sensor substrate 20 and the holding plate 30 are fixed. Accordingly, the holding plate 30 holds the sensor substrate 20. In this adhesion state, a principal plane (front surface) that the holding plate 30 forms is approximately parallel to an appearance surface (a front surface) of the CMOS sensor 21.

A first guide hole 33a and second guide hole 33b are formed in the holding plate 30. Moreover, a first through hole 34a, second through hole 34b, and third through hole 34c are formed in the holding plate 30. The position and movement of the holding plate 30 with respect to the lens barrel 10 in the direction that intersects perpendicularly with the optical axis X are regulated by inserting the guide pins 13a and 13b of the lens barrel 10 into the guide holes 33a and 33b, respectively. The first guide hole 33a is a circular hole, and the second guide hole 33b is a long hole. The adjusting screws 1a, 1b, and 1c are respectively inserted through the through holes 34a, 34b, and 34c. the holding plate 30 is made from sheet metal, such as stainless steel and aluminum, and its thickness is approximately uniform.

Figure 5A:
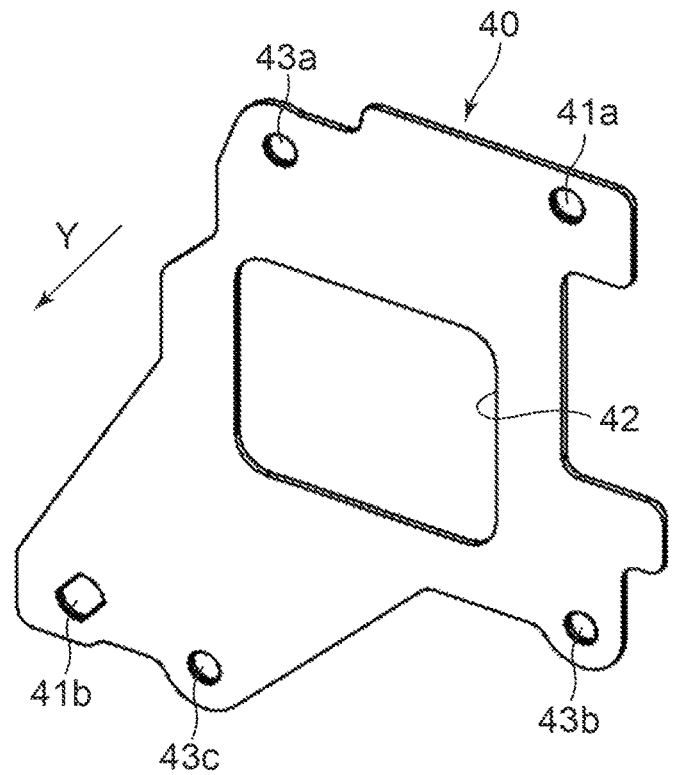
FIG. 5A is a front-side perspective view showing a shim plate of the image pickup unit in FIG. 1.
Figure 5B:
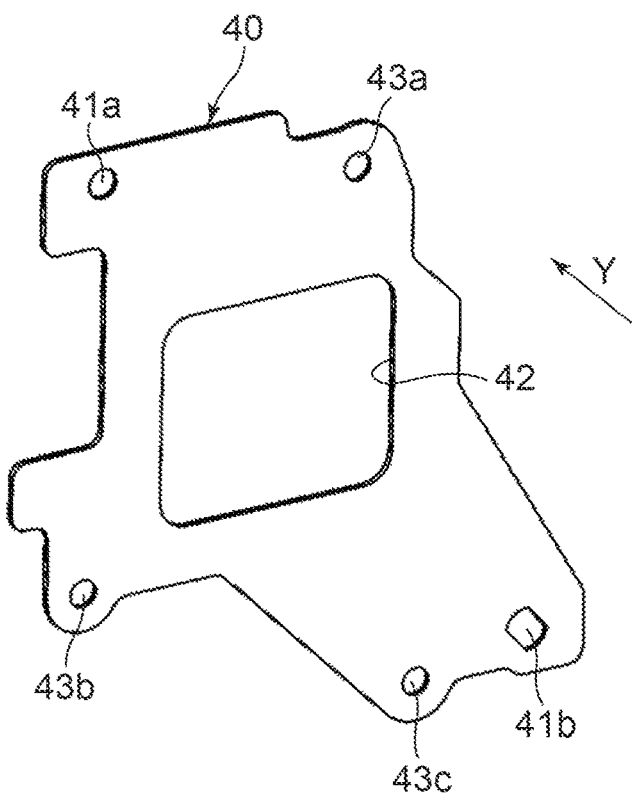
FIG. 5B is a back-side perspective view showing the shim plate.

FIG. 5A and FIG. 5B are a front-side perspective view and back-side perspective view showing the shim plate 40, respectively. A first guide hole 41a and second guide hole 41b are formed in the shim plate 40. The position and movement of the shim plate 40 with respect to the lens barrel 10 in the direction that intersects perpendicularly with the optical axis X are regulated by inserting the guide pins 13a and 13b into the guide holes 41a and 41b. The first guide hole 41a is a circular hole, and the second guide hole 33b is a long hole. The shim plate 40 is provided with a rectangular opening 42 for avoiding interference with the CMOS sensor 21. It should be noted that the shape of the rectangular opening 42 is not limited to the illustration. The shim plate 40 is formed in a shape that avoids the CMOS sensor 21 at least. The adjusting screws 1a, 1b, and 1c are respectively inserted through the through holes 43a, 43b, and 43c. The adjusting screws 1a, 1b, and 1c respectively penetrate the through holes 34a, 34b, and 34c of the holding plate 30 and the through holes 43a, 43b, and 43c of the shim plate 40, and are screwed to the screw bosses 11a, 11 b, and 11c of the lens barrel 10. The shim plate 40 is made from sheet metal, such as stainless steel and aluminum, and its thickness is approximately uniform.

Figure 6A:
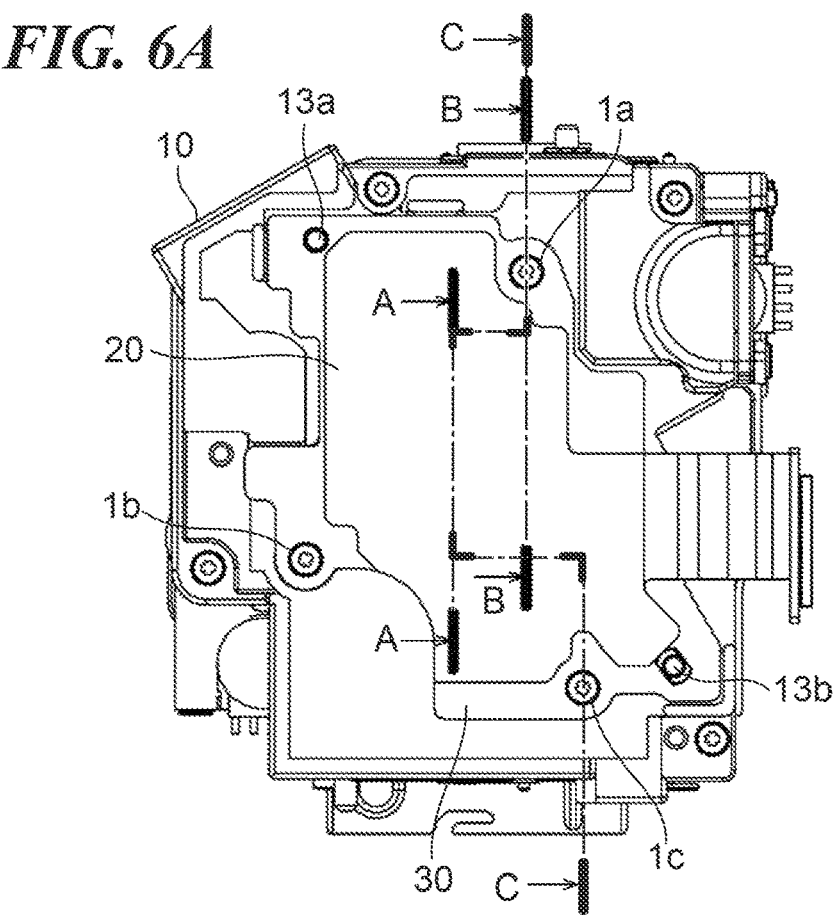
FIG. 6A is a back view showing the image pickup unit.
Figure 6B:
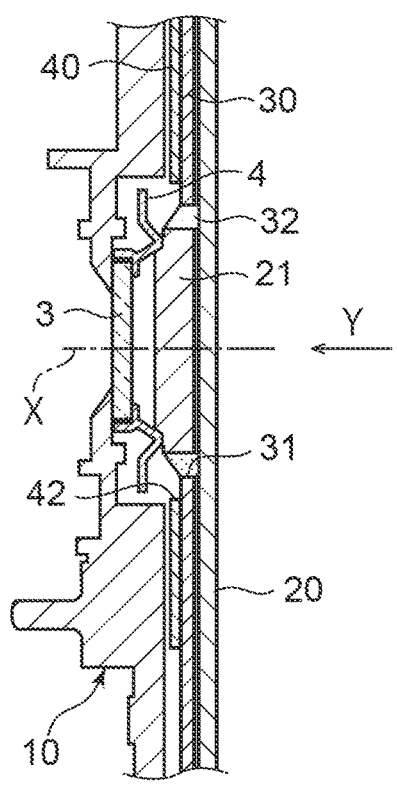
FIG. 6B is a sectional view taken along an A-A line in FIG. 6A.
Figure 7A:
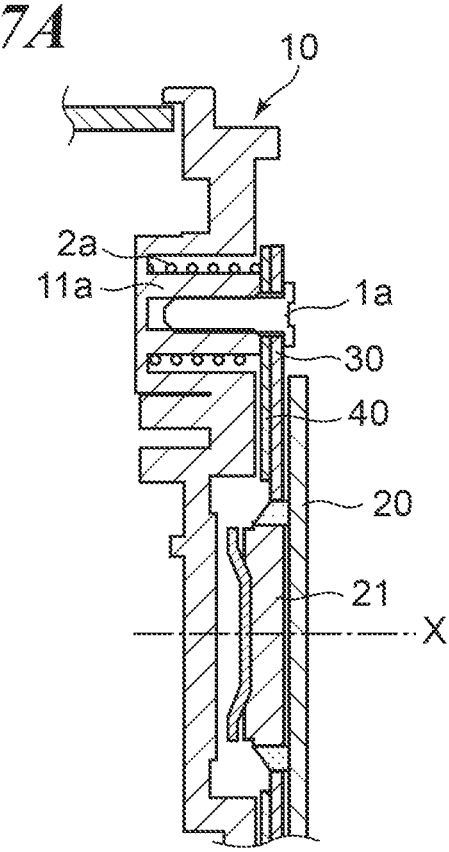
FIG. 7A and FIG. 7B are sectional views taken along a B-B line in FIG. 6A.
Figure 7B:
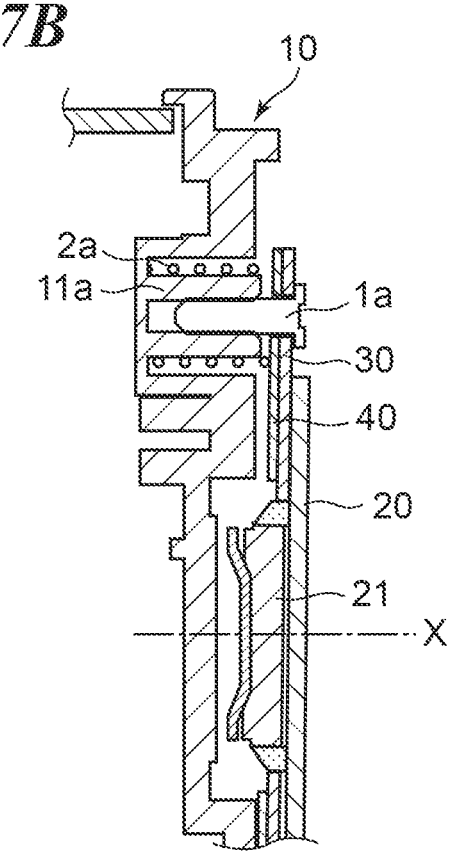

FIG. 6A is a back view showing the image pickup unit 100. FIG. 6B is a sectional view taken along an A-A line in FIG. 6A. FIG. 7A and FIG. 7B are sectional views taken along a B-B line in FIG. 6A. FIG. 6B shows a component configuration around the CMOS sensor 21. FIG. 7A and FIG. 7B show a fastening structure of the holding plate 30 with the first adjusting screw 1a.

As shown in FIG. 6B, the glass 3 and elastic member 4 are arranged between the lens barrel 10 and CMOS sensor 21 in the direction of the optical axis X. The glass 3 is an optical glass for adjusting an image forming position of the image pickup unit 100. The glass 3 may be a low pass filter for reducing moire or false color. The elastic member 4 has a role for holding the glass 3 to the lens barrel 10 and a role for sealing so that dust etc. may not adhere to the surface of the CMOS sensor 21. The elastic member 4 is made from elastic deformable material, such as silicone rubber.

As shown in FIG. 2, the springs 2a, 2b, and 2c, the shim plate 40, and the holding plate 30 are arranged in the direction of the optical axis X sequentially from the side of the lens barrel 10. That is, the shim plate 40 is inserted between the lens barrel 10 and holding plate 30 in the direction of the optical axis X, and the springs 2a, 2b, and 2c are inserted between the lens barrel 10 and shim plate 40.

As shown in FIG. 7A, the holding plate 30 is fastened to first screw boss 11a of the lens barrel 10 with the first adjusting screw 1a. The shim plate 40 and first spring 2a intervene between the holding plate 30 and first screw boss 11a. The first spring 2a is compressed between the shim plate 40 and lens barrel 10. FIG. 7A shows a state where the first adjusting screw 1a is almost fully fastened and the end surface at the −Y side (back side) of the first screw boss 11a contacts the shim plate 40. The fastening structure of the holding plate 30 has been described by focusing on the first adjusting screw 1a as a representative case. The fastening structures about the adjusting screws 1b and 1c, the springs 2b and 2c, and the screw bosses 11b and 11c are also the same.

The springs 2a, 2b, and 2c are energizing members that constitute an energizing mechanism. The springs 2a, 2b, and 2c energize the shim plate 40 and holding plate 30 to the back side (the −Y side) so as to separate from the lens barrel 10 in the direction of the optical axis X when being compressed. It should be noted that springs 2a, 2b, and 2c are coil springs, for example. However, the energizing member only needs to generate energization force in the direction of the optical axis X, and is not limited to a spring.

The heights of the end surface of the screw bosses 11a, 11b, and 11c at the −Y side are designed to the same. Accordingly, the contact surfaces of the screw bosses 11a, 11b, and 11c to the shim plate 40 are approximately flush. Accordingly, when the adjusting screws 1a, 1b, and 1c are fully fastened, the principal plane (surface at the +Y side) formed by the holding plate 30, the back surface (surface at the −Y side) of the holding plate 30, and the appearance surface (surface at the +Y side) of the CMOS sensor 21 approximately intersect perpendicularly with the optical axis X in design.

When each of the adjusting screws 1a, 1b, and 1c is fastened, corresponding portions (engagement points with the adjusting screw) of the shim plate 40 and holding plate 30 are displaced close to the lens barrel 10 in the direction of the optical axis X. When each of the adjusting screws 1a, 1b, and 1c is loosened, corresponding portions of the shim plate 40 and holding plate 30 are displaced away from the lens barrel 10 in cooperation with each of the springs 2a, 2b, and 2c. FIG. 7B shows a state where the first adjusting screw 1a is loosened from the fastened state in FIG. 7A.

When only the first adjusting screw 1a is loosened a little as shown in FIG. 7B from the fastened state, the parts of the shim plate 40 and holding plate 30 corresponding to the first adjusting screw 1a are displaced to the back side (the −Y side) by the energization force of the first spring 2a. As mentioned above, the movement of the holding plate 30 in directions that intersect perpendicularly with the optical axis X is regulated by the fitting structure between the guide pins 13a and 13b and the guide holes 33a and 33b. In the meantime, the two adjusting screws 1b and 1c are still in the fastened state where they are fastened more than the first adjusting screw 1a. Accordingly, the holding plate 30 that holds the CMOS sensor 21 tilts a little from the posture that intersects perpendicularly with the optical axis X.

In this way, the tilt direction of the holding plate 30 and CMOS sensor 21 to the lens barrel 10 is arbitrarily set in a panning direction and a tilting direction by adjusting a loosening amount of at least one of the adjusting screws 1a, 1b, and 1c. Moreover, the tilt amount is also set up arbitrarily.

Figure 8A:
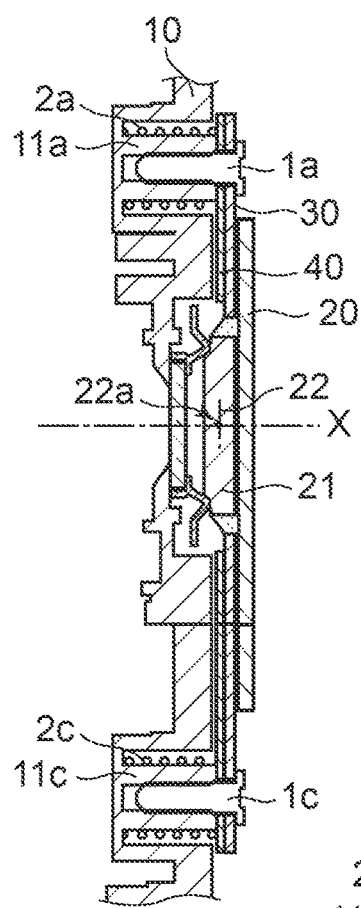
FIG. 8A, FIG. 8B, and FIG. 8C are sectional views taken along a C-C line in FIG. 6A.
Figure 8B:
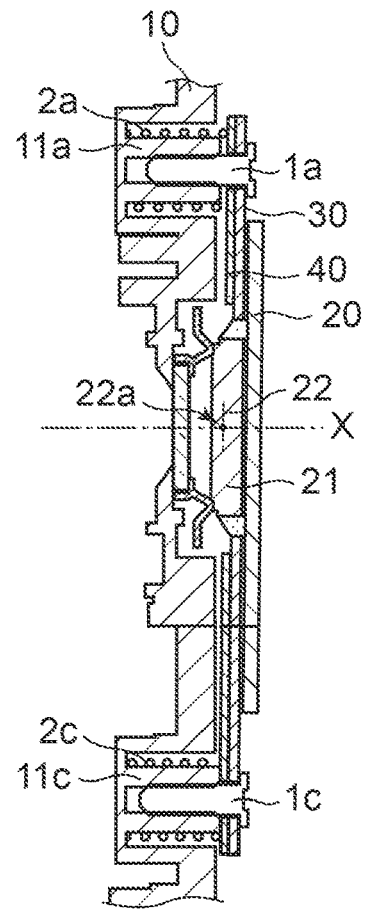
Figure 8C:
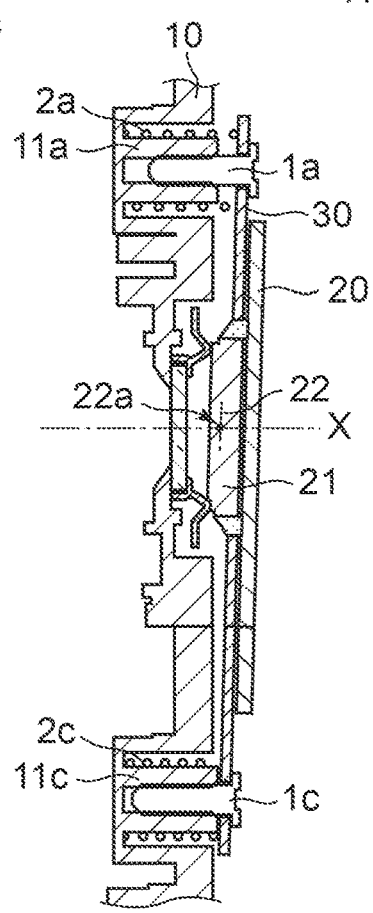

Next, the optical adjustment of the image pickup unit 100 will be described. FIG. 8A, FIG. 8B, and FIG. 8C are sectional views taken along a C-C line in FIG. 6A. FIG. 8A and FIG. 8B show relations between the fastening states of the adjusting screws 1a and 1c and the tilt of the CMOS sensor 21. FIG. 8C shows a state where the shim plate 40 was removed. Its details will be mentioned later.

In FIG. 8A, an image pickup surface 22 is a surface of the CMOS sensor 21 that receives light passing through the lens barrel 10. The center of the image pickup surface 22, which is referred to as an image pickup center 22a in the description, is located on the optical axis X in design. Although a work of an optical adjustment is usually performed before shipment of a product, it may be performed as a maintenance after product shipment. There are two main purposes of the optical adjustment.

The first purpose of the optical adjustment is for keeping a deviation amount between an actual position and a design target position of the image pickup center 22a in the direction of the optical axis X within a permissible range. The optical system of the lens barrel 10 is provided with a focus moving mechanism. Since the focus moving mechanism enables parallel movement of an image plane within a fixed amount in the direction of the optical axis X, deviation due to a manufacturing error is correctable within the range of the fixed amount. If the deviation between the center of the image plane (design target position) and the image pickup center (actual position) in the direction of the optical axis X is too large to correct with the focus moving mechanism, resolution of a center area of image data obtained by the image pickup unit 100 will be lowered. Accordingly, the deviation of the position of the image pickup center 22a from the target position in the direction of the optical axis X must not exceed the correctable range of the focus moving mechanism in an assembled state as a product. In the following description, an available range of the parallel movement of the image plane by the focus moving mechanism is called a "focus correctable range". Moreover, a dropout of the image pickup center 22 from the focus correctable range is called a "center deviation". The focus correctable range is equivalent to an adjustable range of the image plane in the direction of the optical axis X.

The second purpose of the optical adjustment is for keeping a tilt deviation between the image plane and image pickup surface 22 (difference in angles to the plane that intersects perpendicularly with the optical axis X) within a permissible range. The adjustment for the second purpose is called a "tilt adjustment". Partial defocus is reduced by decreasing the tilt deviation by the tilt adjustment. The permissible range referred in this description is set up by a manufacturer on the basis of degree of the partial defocus that occurs according to the tilt deviation between the image plane and image pickup surface 22.

In the optical adjustment work, a worker fully fastens the adjusting screws 1a, 1b, and 1c first as shown in FIG. 8A. In design, in the state in FIG. 8A, the positions of the image pickup center 22a and the center of the image plane approximately coincide in the direction of the optical axis X (the center deviation becomes zero), and the tilts of the image plane and image pickup surface 22 also approximately coincide (the tilt deviation becomes zero). Thus, the projection height of the screw bosses 11a, 11b; and 11c and the thickness of the shim plate 40 are designed so that the center deviation and tilt deviation become zero. At this time, if a manufacturing error causes the center deviation or the tilt deviation, the worker needs to loosen at least one of the adjusting screws 1a, 1b, and 1c appropriately so as to cancel the center deviation or the tilt deviation.

FIG. 8B shows a state after the tilt adjustment that loosens an adjusting screw from the state in FIG. 8A. Specifically, FIG. 8B shows the state after adjusting the tilt of the image pickup surface 22 by loosening the first adjusting screw 1a. The posture of the image pickup surface 22 in the state in FIG. 8B is different from that in the state in FIG. 8A. As mentioned above, since the CMOS sensor 21 is arbitrarily tilted by controlling the loosening amounts of the adjusting screws 1a, 1b, and 1c, the tilt adjustment enables the posture of the image pickup surface 22 to coincide with the posture of the image plane. However, when the first, second, and third adjusting screws 1a, 1b, and 1c are loosened, the image pickup surface 22 moves away from the lens barrel 10, and accordingly, this tilt adjustment moves the image pickup center 22a to the back side on the optical axis X.

FIG. 9A, FIG. 9B, FIG. 10A and FIG. 10B are sectional views showing the configuration around the CMOS sensor 21 taken along the C-C line in FIG. 6A. Various tilt states of the image pickup surface 22 and examples of the optical adjustment work will be described by referring to these drawings. A range between two dotted lines in each drawing denotes the focus correctable range 12.

Figure 9A:
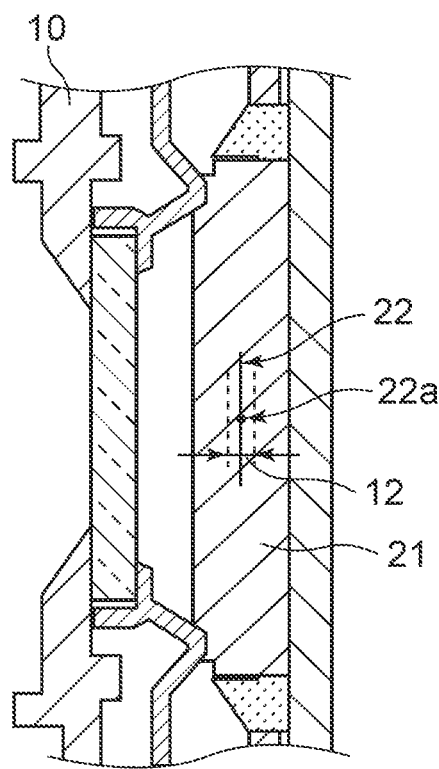
FIG. 9A and FIG. 9B are sectional views showing a configuration around a CMOS sensor taken along the C-C line in FIG. 6A.

FIG. 9A shows a state where the adjusting screws 1a, 1b, and 1c are approximately fully fastened, and shows a state before the tilt adjustment. If there is no manufacture error of the lens barrel 60 etc., the CMOS sensor 21 is in a design ideal position and correctly faces the lens barrel 10 without tilt, and the image pickup center 22a is located at the center of the focus correctable range 12. It should be noted that the state where the image pickup center 22a approximately coincides with the image plane in the direction of the optical axis X (an optical axis direction) corresponds to the state where the image pickup center 22a is included in the focus correctable range 12. There is a manufacture error of the lens barrel 60 etc. actually. When the image pickup center 22a is located within the focus correctable range 12 in the direction of the optical axis X and degree of the partial defocus is kept within the permissible range (i.e., the tilt deviation is kept within the permissible range) in the state where the adjusting screws 1a, 1b, and 1c are fastened, the tilt adjustment work is not required. However, when at least one of the center deviation and tilt deviation exceeds the permissible range, a worker performs the optical adjustment work so as to cancel the deviation.

Figure 9B:
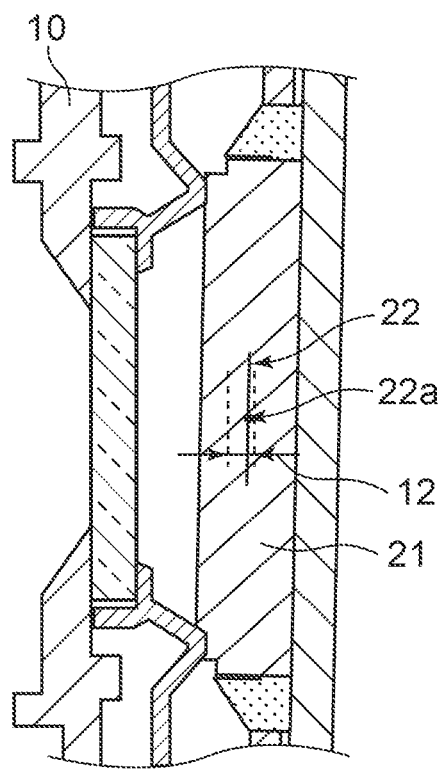

When the tilt of the image pickup surface 22 is adjusted by loosening the adjusting screws 1a, 1b, and 1c from the state in FIG. 9A, a state shown in FIG. 9B appears. In the state in FIG. 9B, the image pickup center 22a moves to the back side than the state in FIG. 9A, but is included in the focus correctable range 12. If the degree of the partial defocus is kept within the permissible range in this state, the tilt adjustment work is finished. However, if the partial defocus is not solved, the worker needs to tilt the CMOS sensor 21 furthermore.

Figure 10A:
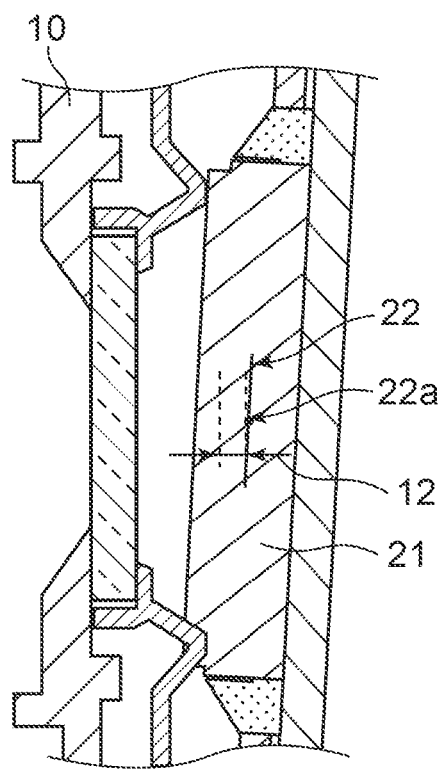
FIG. 10A and FIG. 10B are sectional views showing the configuration around the CMOS sensor taken along the C-C line in FIG. 6A.
Figure 10B:
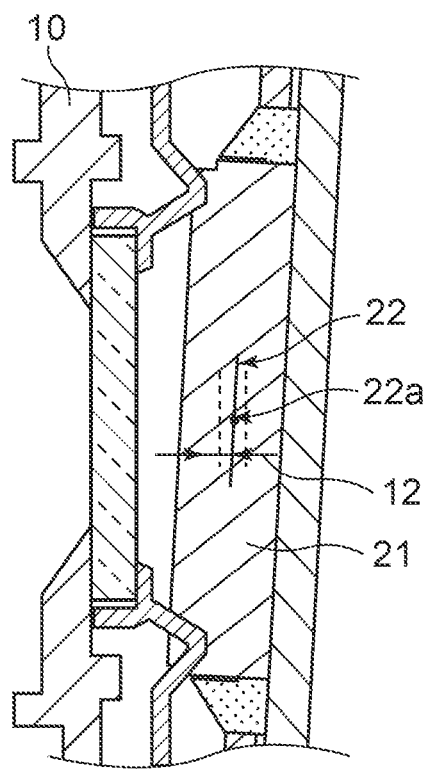

When the worker enlarges the tilt of the image pickup surface 22 from the state in FIG. 9B, the state where the partial defocus is canceled as shown in FIG. 10A is achieved. However, in the state in FIG. 10A, the image pickup center 22a further moves to the back side from the state in FIG. 9B, so that the image pickup center 22a departs from the focus correctable range 12. As mentioned above, when the tilt of the image plane due to a manufacture error and/or an assembling error is large and when the tilt of the image pickup surface 22 becomes too large in order to cancel the partial defocus, the center deviation may occur. At this time, when the image pickup center 22a departs from the focus correctable range 12 to the back side, the center deviation can be canceled by fastening the adjusting screws 1a, 1b, and 1c. However, such a work may cause the tilt deviation again and may lower workability.

Consequently, the shim plate 40 is constituted to be removable in this embodiment. That is, when the image pickup center 22a moves to the back side along the optical axis and the center deviation occurs as a result of canceling the tilt deviation, a worker is able to parallelly move the holding plate 30 including the CMOS sensor 21 to the front side along the optical axis by removing the shim plate 40. Thereby, even if the image pickup surface 22 must be largely tilted to solve the tilt deviation caused by the large manufacture error and/or the large assembling error, a large margin to cancel the center deviation is securable.

When removing the shim plate 40, the worker removes the shim plate 40 after removing the adjusting screws 1a, 1b, and 1c and the holding plate 30 to which the sensor substrate 20 is attached from the lens barrel 10. Then, the worker fastens the holding plate 30 to the lens barrel 10 again with the adjusting screws 1a, 1b, and 1c.

When the shim plate 40 is removed from the state in FIG. 8B, the state in FIG. 8C appears. Compared with the state in FIG. 8B, the image pickup center 22a moves to the front side along the optical axis by the thickness of the shim plate 40. When the shim plate 40 is removed from the state in FIG. 10A, a state in FIG. 10B appears. In the state in FIG. 10B, the tilt of the CMOS sensor 21 is the same as that in FIG. 10A, and no tilt deviation occurs. In the meantime, since the holding plate 30 and CMOS sensor 21 of the shim plate 40 move to the front side along the optical axis by the thickness of the shim plate 40, the image pickup center 22a falls within the focus correctable range 12 and the center deviation is canceled.

Hereinafter, a configuration that the holding plate 30 is directly fixed to the screw bosses 11a, 11b, and 11c without mounting the shim plate 40 like the conventional technique will be considered. A worker fastens the holding plate 30 to the screw bosses 11a, 11b, and 11c with the adjusting screws 1a, 1b, and 1c. After that, the worker loosens the adjusting screws 1a, 1b, and 1c by a predetermined amount so that the energization forces of the springs 2a, 2b, and 2c move the holding plate 30 to the back side along the optical axis in order to dispose the CMOS sensor 21 at a design ideal position. However, if the loosening amounts of the adjusting screws 1a, 1b, and 1c disperse, the holding plate 30 will tilt.

Moreover, the configuration that is not provided with the shim plate 40 may be designed so that the CMOS sensor 21 will be disposed at a design ideal position and the tilt deviation will be zero in the state where the holding plate 30 is fastened to the screw bosses 11a, 11b, and 11c with the adjusting screws 1a, 1b, and 1c. However, this configuration loses a margin that allows the CMOS sensor 21 to move to the front side along the optical axis. Accordingly, the posture or the position of the CMOS sensor 21 may not become suitable by the optical adjustment work. Accordingly, this embodiment is advantageous because it allows the CMOS sensor 21 to move to the front side along the optical axis by removing the shim plate 40.

In the embodiment, the thickness of the shim plate 40, etc. are constituted so that the tilt of the image pickup surface 22 to the image plane will become approximately zero and so that the image pickup center 22a will approximately coincide with the center of the image plane in the optical axis direction in design, in the state where all the adjusting screws 1a, 1b, and 1c are fastened. Thereby, when the center deviation and tilt deviation fall within the permissible range in the state where all the adjusting screws 1a, 1b, and 1c are fastened, the optical adjustment work is omissible. Moreover, since the embodiment has a high possibility to reduce the center deviation and tilt deviation as compared with the case where the adjusting screws 1a, 1b, and 1c are fastened and loosened, the optical adjustment work is simplified. Moreover, since the work of loosening the adjusting screws 1a, 1b, and 1c after fastening is not always required, workability improves. Accordingly, the optical adjustment work for the image pickup surface is simplified.

Moreover, the shim plate 40 is removable. After removing the shim plate 40, the tilt of the image pickup surface and the position of the image pickup surface in the direction of the optical axis are adjustable by fastening or loosening the adjusting screws 1a, 1b, and 1c. This secures a margin for the optical adjustment work in any directions while keeping the possibility of omission of the optical adjustment work.

Next, a second embodiment of the present invention will be described. In the first embodiment, it is necessary to detach the adjusting screws 1a, 1b, and 1c when the shim plate 40 is removed. As compared with this, in the second embodiment, the shim plate is removable in a state where the adjusting screws 1a, 1b, and 1c are loosened without detaching from the screw bosses 11a, 11b, and 11c.

Figure 11:
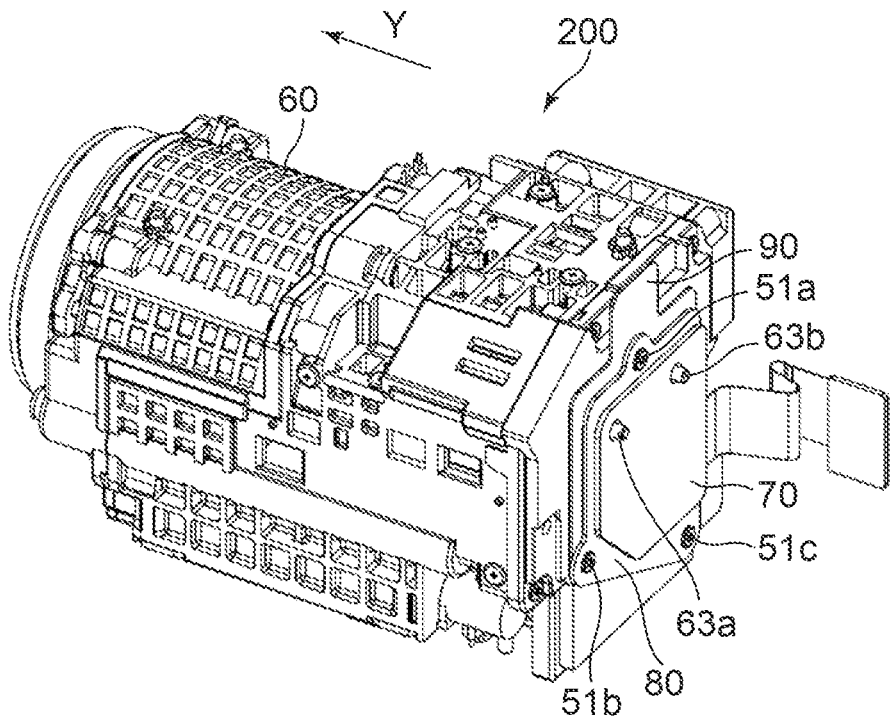
FIG. 11 is a perspective view showing an image pickup unit according to a second embodiment of the present invention.
Figure 12:
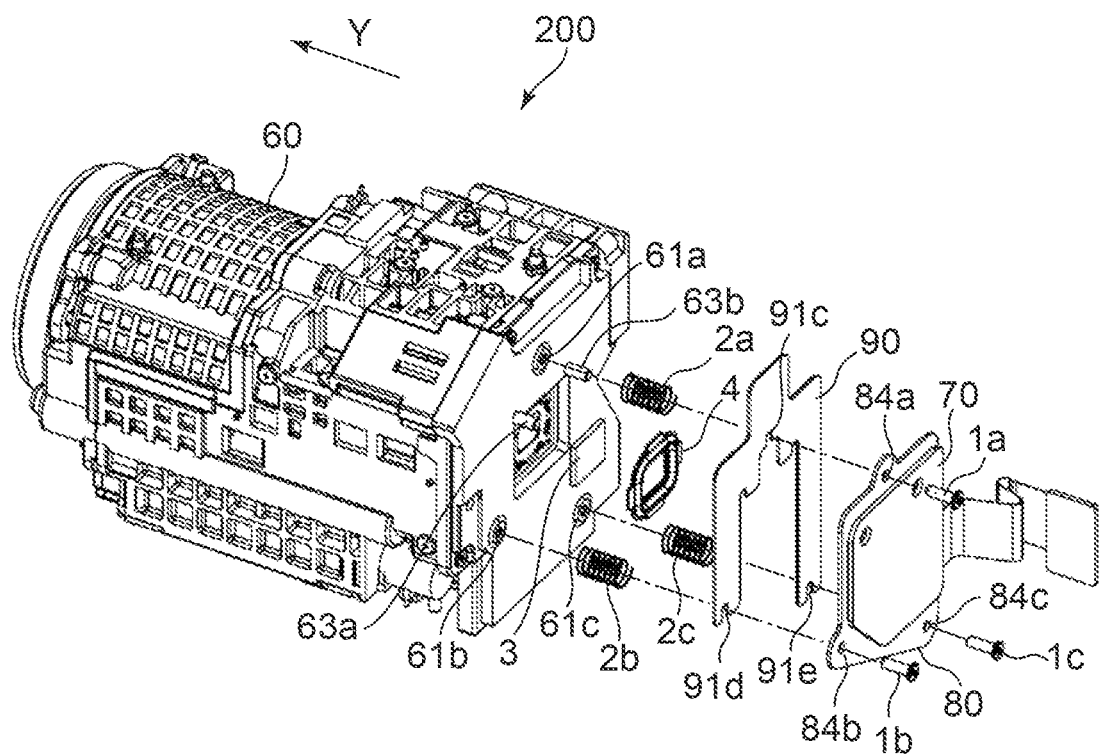
FIG. 12 is an exploded perspective view of the image pickup unit in FIG. 11.

FIG. 11 and FIG. 12 are respectively a perspective view and an exploded perspective view showing an image pickup unit according to the second embodiment of the present invention. This image pickup unit 200 has a lens barrel 60, a sensor substrate 70, a holding plate 80, a shim plate 90, the adjusting screws 1a, 1b, and 1c, the springs 2a, 2b, and 2c, the glass 3, the elastic member 4, screw bosses 61a, 61b, and 61c, and guide pins 63a and 63b. The lens barrel 60, sensor substrate 70, holding plate 80, and shim plate 90 respectively correspond to the lens barrel 10, sensor substrate 20, holding plate 30, and shim plate 40 in the first embodiment. The screw bosses 61a, 61b, and 61c correspond to the screw bosses 11a, 11b, and 11c, and the guide pins 63a and 63b correspond to the guide pins 13a and 13b. Although some of these mutually corresponding components are different in shape and arrangement, fundamental configurations are common. Accordingly, unique points in this embodiment will be mainly described.

Figure 13A:
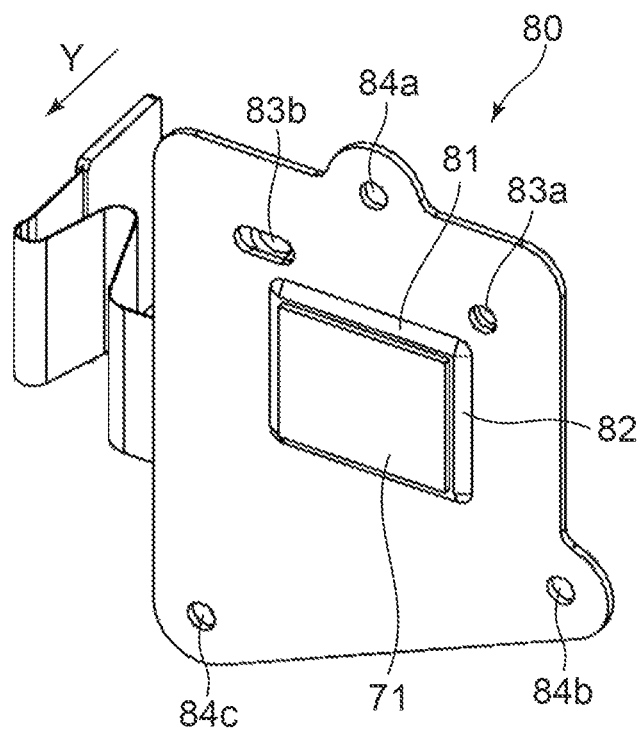
FIG. 13A is a front view showing an adhesion state of a sensor substrate and a holding plate.
Figure 13B:
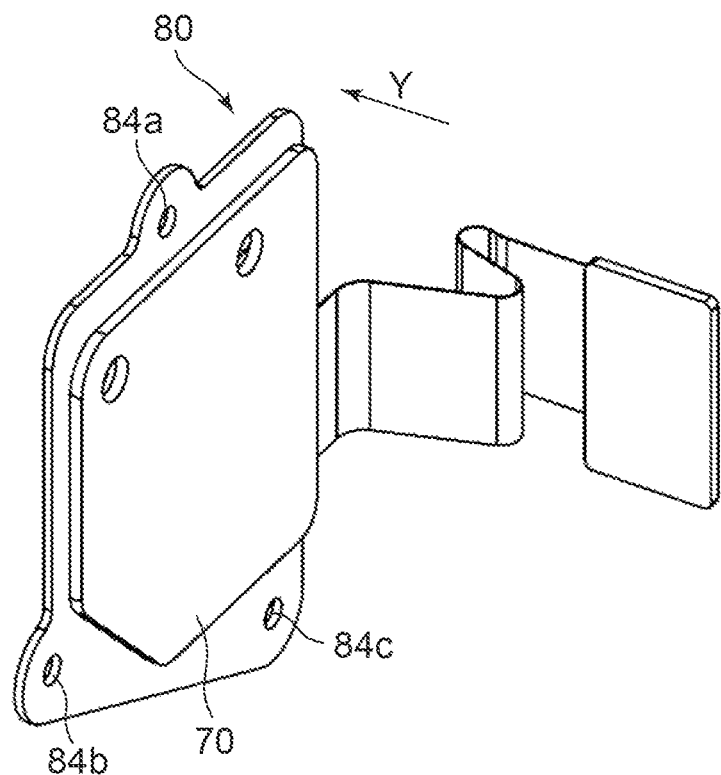
FIG. 13B is a back-side perspective view showing the sensor substrate and the holding plate.

FIG. 13A and FIG. 13B are a front-side perspective view and back-side perspective view showing an adhesion state of the sensor substrate 70 and holding plate 80. As shown in FIG. 13A, the holding plate 80 is provided with an opening 81 corresponding to the opening 31 (FIG. 3A). As with the first embodiment (FIG. 3B, FIG. 4), the sensor substrate 70 is attached to the holding plate 80 from the back side, and a CMOS sensor 71 protrudes from the opening 81 to the front side of the holding plate 80. The sensor substrate 70 adheres to the holding plate 80 with adhesive material 82. Guide holes 83a and 83b (FIG. 13A) correspond to the guide holes 33a and 33b (FIG. 3A). Through holes 84a, 84b, and 84c correspond to the through holes 34a, 34b, and 34c (FIG. 3B). The adjusting screws 1a, 1b, and 1c are respectively inserted through the through holes 84a, 84b, and 84c.

Figure 14A:
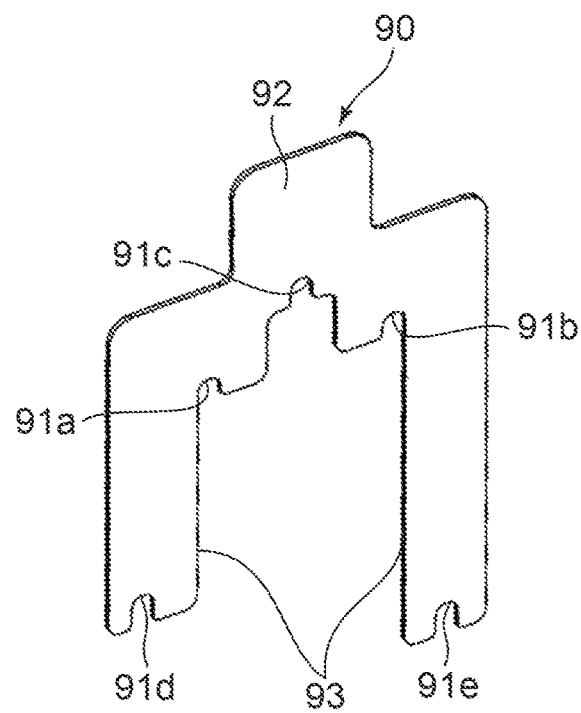
FIG. 14A is a back-side perspective view showing a shim plate of the image pickup unit in FIG. 11.
Figure 14B:
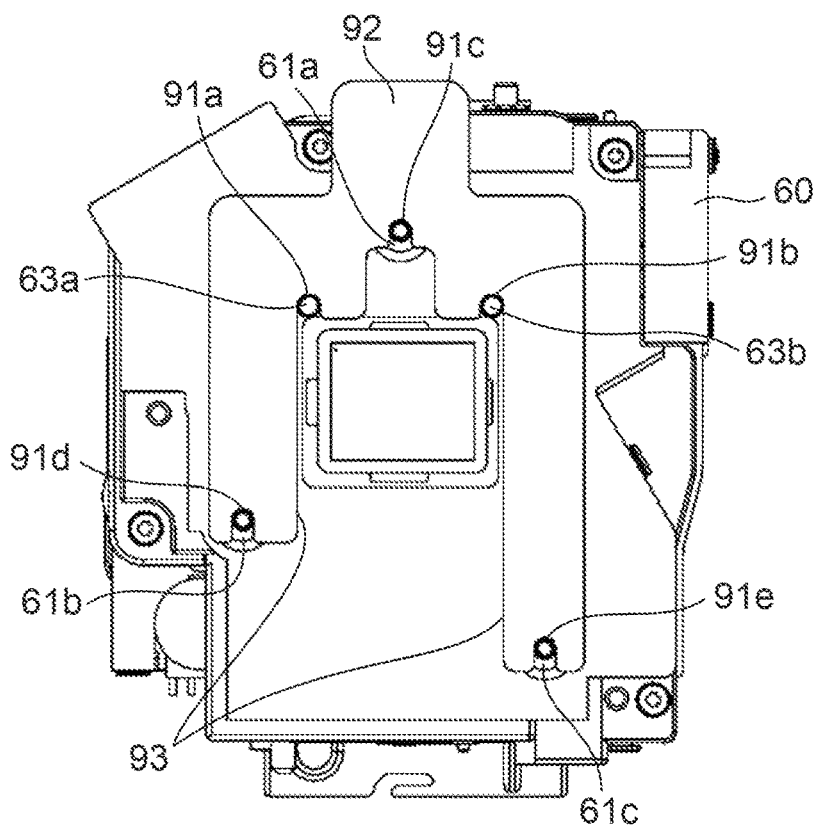
FIG. 14B is a back view showing a state where the shim plate is mounted on the lens barrel.

FIG. 14A is a back-side perspective view showing the shim plate 90. FIG. 14B is a back view showing a state where the shim plate 90 is mounted on the lens barrel 60. The shim plate 90 has a first cutout 91a, second cutout 91b, third cutout 91c, fourth cutout 91d, and fifth cutout 91e. The guide pins 63a and 63b of the lens barrel 60 respectively fit into the cutouts 91a and 91b, so that the position of the shim plate 90 to the lens barrel 60 is regulated. When the position of the shim plate 90 to the lens barrel 60 is regulated, the holes of the screw bosses 61a, 61b, and 61c can be seen through the cutouts 91c through 91e from the back side. Accordingly, the adjusting screws 1a, 1b, and 1c can be screwed to the screw bosses 61a, 61b, and 61c in a state where the holding plate 80 is mounted on from the configuration in FIG. 14B.

Moreover, the shim plate 90 is provided with an opening 93 for avoiding interference with the CMOS sensor 71. The opening 93 is located in the center of the shim plate 90, and the shim plate 90 is formed in a U-shape that surrounds three sides of the CMOS sensor 71. When the shim plate 90 is mounted, the opening 93 opens downward. The opening 93 is an escape portion for avoiding interference with the CMOS sensor 71. The cutouts 91a through 91e are escape portions for avoiding interference with the adjusting screws 1a, 1b, and 1c and the guide pins 63a and 63b. All the escape portions open in the same direction (downward) that intersects perpendicularly with the optical axis X. Moreover, the shim plate 90 has a grip 92 that is formed so as to be protruded in an upward direction that is opposite to the opening direction of the opening 93. The adjusting screws 1a, 1b, and 1c are respectively inserted through the through holes 84a, 84b, and 84c of the holding plate 80 and the cutouts 91c through 91e of the shim plate 90, and are screwed to the screw bosses 61a, 61b, and 61c of the lens barrel 60.

The image pickup unit 200 allows the tilt adjustment for the CMOS sensor 71 to arbitrary tilt by controlling the loosening amounts of the adjusting screws 1a, 1b, and 1c as with the first embodiment. Moreover, the image pickup unit 200 allows the parallel movement of the holding plate 80 including the CMOS sensor 71 to the front side along the optical axis by removing the shim plate 90 from the image pickup unit 200. Particularly, the shim plate 90 can be removed after loosening the adjusting screws 1a, 1b, and 1c by a predetermined amount from the image pickup unit 200 in the assembly state shown in FIG. 11.

Figure 15A:
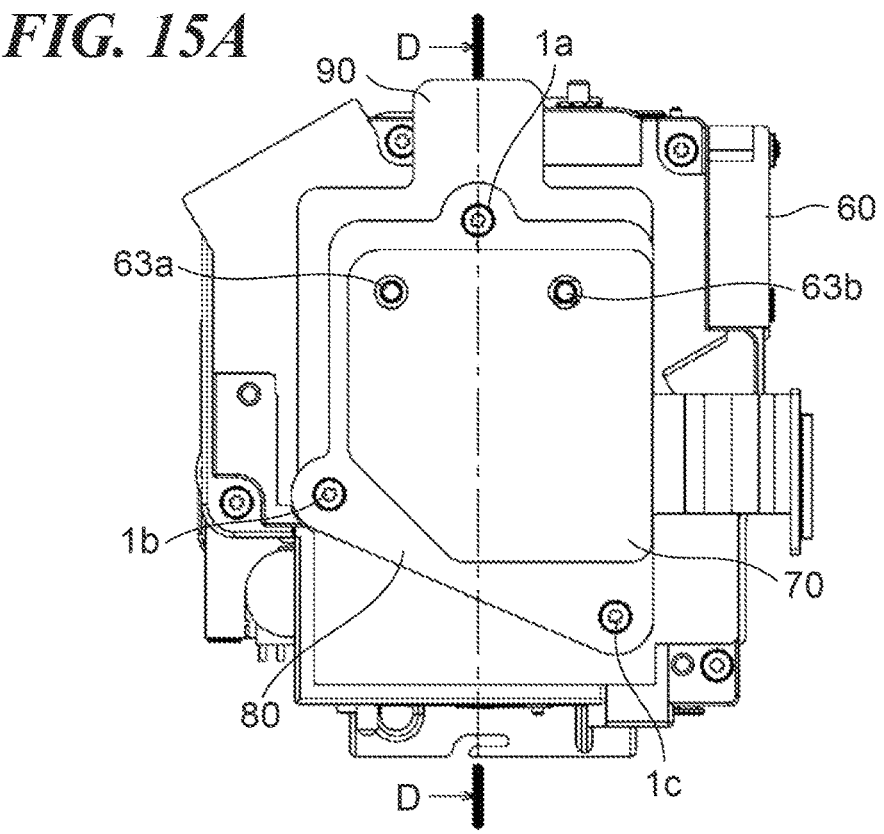
FIG. 15A is a back view of the image pickup unit in FIG. 11.
Figure 15B:
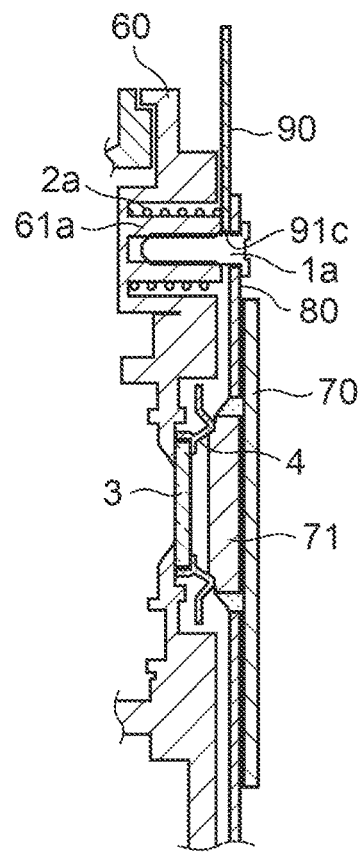
FIG. 15B is a sectional view taken along a D-D line in FIG. 15A.

FIG. 15A is a back view showing the image pickup unit 200. FIG. 15B is a sectional view taken along a D-D line in FIG. 15A. FIG. 15B shows a state where the adjusting screws 1a, 1b, and 1c are loosened.

In the state where the adjusting screws 1a, 1b, and 1c are fastened, the shim plate 90 is supported by being sandwiched between the screw bosses 61a, 61b, and 61c and the holding plate 80. The cutouts 91a through 91e of the shim plate 90 open downward. Accordingly, when the adjusting screws 1a, 1b, and 1c are loosened, the shim plate 90 can be removed upwardly because a gap occurs between the holding plate 30 and the screw bosses 61a, 61b, and 61c as shown in FIG. 15B. A worker is able to remove the shim plate 90 easily by holding and pulling the grip 92 of the shim plate 90 after loosening the adjusting screws 1a, 1b, and 1c a little. Since the grip 92 is protruded to the opposite side of the opening direction of the cutouts 91a through 91e, the removing work is easy.

Since the cutouts 91a through 91e open downward, the shim plate 90 does not fall from the lens barrel 60 when the image pickup unit 200 is in the regular position shown in FIG. 14B.

According to this embodiment, the same result as the first embodiment is obtained about the simplification of the optical adjustment work for the image pickup surface. Moreover, since the shim plate 90 can be removed without detaching the adjusting screws 1a, 1b, and 1c and holding plate 80 from the lens barrel 60, time and effort can be lessened even if an optical adjustment work needs removing the shim plate 90. Accordingly, the optical adjustment work is simplified.

In the above-mentioned embodiments, the guide pins 13a, 13b, 63a, and 63b that are the guide members regulate the movement and position of both of the holding plate and shim plate in directions within the plane that intersects perpendicularly with the optical axis X. However, a guide mechanism for regulating the position of the holding plate and another guide mechanism for regulating the position of the shim plate may be provided independently.

In the above-mentioned embodiments, the three springs 2a, 2b, and 2c corresponding to the adjusting screws 1a, 1b, and is have been exemplified as the energizing members that energize the shim plate 40 and holding plate 30 to the −Y side in the direction of the optical axis X. However, the number of the energizing members does not matter, and it is unnecessary to provide the energizing members corresponding to the adjusting screws 1a, 1b, and 1c. For example, a single large spring may be used to energize the whole of the shim plate 40 and holding plate 30.

Moreover, although the embodiments employ the three adjusting screws 1a, 1b, and 1c, the number of screws is three or more in order to adjust tilt. The number of the screws may be four.

Although the present invention has been described in detail on the basis of the preferred embodiments, the present invention is not limited to such preferred embodiments and includes various configurations in the scope that does not deviate from the gist of the invention. Parts of the above-mentioned embodiments may be combined suitably.

OTHER EMBODIMENTS

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-195148, filed Oct. 16, 2018, which is hereby incorporated by reference herein in its entirety.

What is claimed is:

1. An image pickup unit comprising:
a holding plate that holds an image sensor board on which an image sensor is implemented;
a lens barrel that includes an optical system that forms an object image on the image sensor;
a shim plate that is inserted between the lens barrel and the holding plate in an optical axis direction of the optical system and that has a shape to avoid the image sensor at least;
an energizing mechanism that is inserted between the shim plate and the lens barrel in the optical axis direction and that energizes the shim plate and the holding plate in a direction away from the lens barrel; and
at least three adjusting screws that screw to the lens barrel to fix the holding plate and the shim plate to the lens barrel, each of which displaces corresponding portions of the shim plate and the holding plate in a direction close to the lens barrel when being fastened and displaces the corresponding portions in a direction away from the lens barrel in cooperation with the energizing mechanism when being loosened,
wherein the shim plate is constituted so that tilt of an image pickup surface of the image sensor to an image plane of the optical system will become approximately zero and so that a position of the image pickup surface will approximately coincide with a position of the image plane in the optical axis direction in design, in the state where all the adjusting screws are fastened.

2. The image pickup unit according to claim 1, wherein the optical system allows to adjust the position of the image plane in the optical axis direction within a predetermined range, and
wherein a state where the position of the image pickup surface approximately coincides with the position of the image plane in the optical axis direction corresponds to a state where the position of the image pickup surface is included in the predetermined range.

3. The image pickup unit according to claim 1, wherein the shim plate is removable, and
wherein the tilt of the image pickup surface and the position of the image pickup surface in the optical axis direction are adjustable using the at least three adjusting screws even after removing the shim plate.

4. The image pickup unit according to claim 1, wherein the shim plate is removable by loosening the at least three adjusting screws that are screwed to the lens barrel.

5. The image pickup unit according to claim 1, wherein the lens barrel has a guide member for regulating movements of the holding plate and the shim plate in a direction that intersects perpendicularly with the optical axis direction.

6. The image pickup unit according to claim 5, wherein the shim plate has escape portions for avoiding interference with the image sensor, the at least three adjusting screws, and the guide member,
wherein all the escape portions open in an opening direction that intersects perpendicularly with the optical axis direction, and wherein the shim plate is removed in a direction opposite to the opening direction.

7. The image pickup unit according to claim 6, wherein the shim plate has a grip protruded in a direction opposite to the opening direction.

8. The image pickup unit according to claim 1, wherein the energizing mechanism includes a plurality of energizing members that are provided corresponding to the at least three adjusting screws, respectively.

9. The image pickup unit according to claim 1, wherein thickness of the shim plate is approximately uniform, and
wherein a surface of the shim plate that faces the lens barrel approximately intersects perpendicularly with the optical axis direction in design in a state where all the at least three adjusting screws are fastened.

* * * * *